June 24, 1969   P. N. KESTEN ET AL   3,451,841
CERAMIC FOAM
Filed Oct. 22, 1965
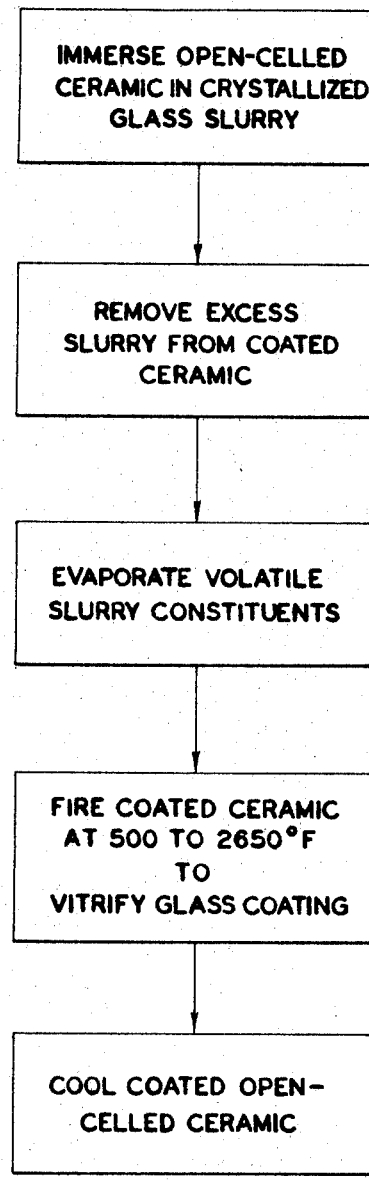
INVENTORS
Patrick N. Kesten &
Karl Schwartzwalder
Peter P. Kozak
ATTORNEY United States Patent Office 3,451,841
Patented June 24, 1969

3,451,841
CERAMIC FOAM
Patrick N. Kesten, Davison, and Karl Schwartzwalder, Holly, Mich., assignors to General Motors Corporation, Detroit, Mich., a corporation of Delaware
Filed Oct. 22, 1965, Ser. No. 501,042
Int. Cl. B28b *19/00;* C04c *41/06;* C03c *7/02*
U.S. Cl. 117—98                                      9 Claims

ABSTRACT OF THE DISCLOSURE

A high strength, porous ceramic foam is disclosed. The open-celled porous ceramic structure has a fused porous crystallized glass coating on the cell-defining walls of the foam structure. The crystallized glass coating increases the strength of the structure without decreasing the porosity of the structure.

---

This invention relates to an open-celled, porous ceramic structure and more particularly to a coating to increase the strength of the ceramic structure.

An open-celled, porous ceramic structure such as described in U.S. Patent 3,090,094, issued May 21, 1963 to Schwartzwalder and Somers, has a tendency to be brittle and weak thereby limiting its usefulness.

It is a basic object of this invention to provide an improved, open-celled ceramic structure which is strong and porous and a method for making the same.

These and other objects of the present invention are produced by coating an open-celled, porous ceramic structure with a slurry of crystallizing glass, draining the excess slurry from the structure, evaporating the volatile slurry constituents from the coating, and subsequently firing the structure to yield a high strength, porous open-celled article consisting of an open-celled ceramic structure tightly surrounded by a fused crystallized glass coating.

Further objects and advantages of the present invention will be apparent from the following detailed description, reference being had to the accompanying flow sheet and the following examples wherein preferred embodiments of the present invention are clearly shown.

The principal steps in the process of this invention are illustrated in the accompanying flow sheet.

The high strength, porous ceramic articles described in this invention are formed in the following manner. An open-celled, porous ceramic article is made by the method described in U.S. Patent 3,090,094 or by a method in which the organic filler is burned out of a ceramic powder-organic filler mixture by firing the mixture. Cellular ceramic articles are produced in accordance with the method described in U.S. Patent 3,090,094 by immersing an open-celled, porous element of pliable synthetic or natural organic material in a slurry of finely divided ceramic powder plus ceramic binder so as to uniformly coat the inner cell defining walls of the element with a thin layer of the slurry. Polyurethane foam having 15 to 50 pores per linear inch produces the good results although other commercially available open-celled organic sponge materials such as cellulose sponge or polyvinyl chloride foam and the like may be used. The slurry may contain various ceramic materials, such as zirconia, zircon, petalite, mullite, talc, silica and alumina. Clay, sodium silicate, and a mixture of calcium aluminate and phosphoric acid are suitable binders for the slurry which is necessary to eliminate the danger of the ceramic particles collapsing during or after removal of the organic material and before the ceramic has been vitrified. The slurry may contain a flux such as silica, the alkaline earth oxides, and silicates to reduce the vitreous occasion temperature and improve the physical properties of the same ceramic article. A satisfactory aqueous slurry is composed, by weight, of about 67% of 100 mesh and finer zircon powder, 10% by weight calcium aluminate, 15% by weight phosphoric acid (75% $H_3PO_4$, 25% $H_2O$) and 8% additional water. A rectangular slab of open-cell polyurethane foam is immersed in this slurry and while so immersed, is alternately compressed and permitted to expand until the slurry extended completely through the foam. The foam slab is then removed from the solution and the excess slurry squeezed out. The slab is then heated for about 2 hours at 200° F. to evaporate the water, and then it is fired from room temperature to approximately 2550° F. and back to room temperature over an 8 hour period thereby completely vaporizing and burning out the organic polyurethane foam and vitrifying the ceramic to form a porous, self-sustaining open-celled ceramic.

This fired open-celled, porous ceramic structure is sprayed with or immersed in an aqueous slurry of crystallizing glass in order to coat the walls of the ceramic foam with the slurry. The slurry contains 40 to 50% by weight water, 1 to 5% by weight of a binder and 50 to 60% by weight of a crystallizing glass frit. The binder may be an organic binder such as dritex which is a hydrogenated cottonseed oil or it may be an inorganic clay or bentonite. The crystallizing glass frit is a glass frit which upon firing will form a solid mass of glass crystals instead of the usual amorphous nonporous glass. Glass frits may be compounded with titania and/or with zirconia in order to make a frit which will crystallize. The amount of titania or zirconia which is required may range from less than 1% up to 25% and will depend upon the other oxides in the frit. These crystallized glasses have a dull appearance and may be porous in contrast to the conventional glass glazes which are shiny and nonporous. It is essential in this invention to have a crystallized glass coating in order to obtain a porous coating since the porous coating is required to maintain the porous characteristics of the porous open-celled ceramic structure. The particle size of the glass should be —100 mesh or finer to insure a uniform coating.

An optional procedure which may be used for applying the aqueous slurry is as follows. The open-celled ceramic structure is heated to 150° F. and then dipped into an aqueous slurry. This step will enable one to apply a thicker coating on the open-celled ceramic structure; that is by heating the ceramic structure, the slurry or coating on the surface of the heated structure will solidify immediately due to vaporization of the water. As a result, more of the slurry will adhere to the surface of the open-celled structure. It is important that the coating is not so thick that the open-cells are clogged or filled with the coating thereby reducing the permeability of the open-celled structure. The coating may be thicker when the openings or cells in the structure are larger. Fired coatings having a thickness of 0.0005 to 0.0030 inch will provide excellent results.

After the ceramic foam structure has been coated with an aqueous slurry, the excess slurry is removed by shaking and draining. The volatile slurry constituents are evaporated to an extent sufficient for the outer surface of the coating to solidify. The coating on the foam structure is fused by heating the structure in an oven for 10 to 15 minutes wherein the temperature of the oven is in the range of 1500 to 2650° F. depending upon the temperature at which the glass fuses. The temperature at which the crystallized glass coating fuses depends on the composition of the glass. After the coating has been fused, the structure is removed from the oven and allowed to cool thereby yielding a high strength, porous open-celled ceramic article consisting of an open-celled ceramic structure surrounded tightly by a fused crystallized glass coating.

The following examples will serve to more fully illustrate the invention:

EXAMPLE 1

An aqueous slurry consisting by weight of about 40 to 50% water, 2% bentonite and 50 to 60% by weight glass frit were stirred to form a homogeneous slurry. The glass frit contained by weight 65% $SiO_2$, 25% PbO, 1.2% $Al_2O_3$, 1% TiO, 1% $B_2O_3$, 1% BaO and 1% ZnO and had a particle size of —200 mesh or finer. An open-celled alumina ceramic structure was formed by the method described in U.S. Patent 3,090,094. This ceramic structure had large cell openings, that is, about 15 to 25 pores per linear inch thereby resulting in a coarse foam structure. Coarse open-celled structures of this type are very fragile and brittle. This coarse ceramic foam structure was dipped into the aqueous slurry for 5 seconds, a time sufficient for the slurry to completely fill all the air spaces in the ceramic foam structure. The ceramic foam structure is then removed from the slurry and shaken for 10 to 30 seconds to remove the excess slurry from the structure. The coated ceramic structure is then allowed to stand at room temperature for 3 to 5 minutes to permit any remaining excess slurry to drain therefrom. This step also allows the water in the slurry to evaporate sufficiently for the outer surface of the slurry coating to air dry. The coated open-celled ceramic structure is then placed in an oven having a temperature of 1650° F. for 10 minutes in order to fuse the crystallized glass. The ceramic structure is then removed from the oven and allowed to cool. The resultant crystallized glass coated, coarse, open-celled ceramic structure has increased physical strength and retains its porosity.

EXAMPLE 2

The procedure and aqueous slurry employed in Example No. 1 were used on an open-celled alumina ceramic structure having 25 to 50 pores per linear inch. As a result of having a fine cell structure, the strength of the uncoated material was higher in view of the higher ceramic content. The resultant crystallized glass coated, fine open-celled ceramic article obtained in this example had excellent physical strength as well as retaining its porosity. The strength of this coated ceramic article was increased considerably more than the ceramic article in Example No. 1 because there was more of the ceramic cell structure which could be coated. In other words, the strength increase of the ceramic foam structure is directly proportional to the quantity of the crystallized glass coating used.

What is claimed is:

1. A high strength, porous ceramic foam article comprising a porous cellular ceramic structure having numerous cells disposed therethrough, said cellular structure being open celled, and a fused porous crystallized glass coating on the cell-defining walls of said structure, said coating having a thickness of 0.0005 to 0.0030 inch, said crystallized glass coating increasing the strength of said structure without decreasing the porosity of said structure.

2. An article as defined in claim 1 wherein said crystallized glass contains 1 to 25% by weight titania.

3. An article as defined in claim 1 wherein said crystallized glass coating contains 1 to 25% by weight zirconia.

4. An article as defined in claim 1 wherein said crystallized glass coating contains 50 to 75% by weight $SiO_2$, 10 to 35% by weight PbO, 1 to 10% by weight $Al_2O_3$, 1 to 10% by weight $TiO_2$, 1 to 10% by weight $B_2O_3$, 1 to 10% by weight $Na_2O$, 1 to 10% by weight BaO and 1 to 10% by weight ZnO.

5. A method for forming porous ceramic foam articles of high strength comprising the steps of coating an open-celled, porous ceramic structure with a crystallized glass slurry containing 40 to 50 weight percent water, draining the excess glass slurry from said ceramic structure, drying the outer surface of said coating and firing said ceramic structure at a temperature in the range of 1500 to 2650° F. to fuse said crystallized glass coating to a thickness of 0.0005 to 0.0030 inch.

6. A method as described in claim 5 wherein said crystallized glass contains 1 to 25% by weight titania.

7. A method as described in claim 5 wherein said crystallized glass contains 1 to 25% by weight zirconia.

8. A method as described in claim 5 wherein said crystallized glass contains 50 to 75% by weight $SiO_2$, 10 to 35% by weight PbO, 1 to 10% by weight $Al_2O_3$, 1 to 10% by weight $TiO_2$, 1 to 10% by weight $B_2O_3$, 1 to 10% by weight $Na_2O$, 1 to 10% by weight BaO and 1 to 10% by weight ZnO.

9. A method as described in claim 5 wherein said coating step consists of immersing said structure in said slurry.

References Cited

UNITED STATES PATENTS 2,681,865 6/1954 Heie.
2,920,971 1/1960 Stookey _____ 65—33 XR

FOREIGN PATENTS 254,225 9/1964 Australia.

ALFRED L. LEAVITT, Primary Examiner.

W. F. CRYON, Assistant Examiner.

U.S. Cl. X.R.

117—125, 169